(12) United States Patent  
Eloul et al.

(10) Patent No.: US 11,782,700 B2  
(45) Date of Patent: Oct. 10, 2023

(54) METHOD AND SYSTEM FOR AUTOMATIC ASSIGNMENT OF CODE TOPICS

(71) Applicant: JPMorgan Chase Bank, N.A., New York, NY (US)

(72) Inventors: Shaltiel Eloul, London (GB); Sean Moran, Putney (GB); Jacky CT Chan, Hong Kong (HK)

(73) Assignee: JPMORGAN CHASE BANK, N.A., New York, NY (US)

( * ) Notice: Subject to any disclaimer, the term of this patent is extended or adjusted under 35 U.S.C. 154(b) by 197 days.

(21) Appl. No.: 17/449,346

(22) Filed: Sep. 29, 2021

(65) Prior Publication Data

US 2023/0098939 A1 Mar. 30, 2023

(51) Int. Cl.
*G06F 8/70* (2018.01)
*G06N 7/01* (2023.01)
*G06F 16/16* (2019.01)

(52) U.S. Cl.
CPC ............... *G06F 8/70* (2013.01); *G06F 16/16* (2019.01); *G06N 7/01* (2023.01)

(58) Field of Classification Search
CPC .............. G06N 7/01; G06F 8/70; G06F 16/16
See application file for complete search history.

(56) References Cited

U.S. PATENT DOCUMENTS

2022/0236964 A1* 7/2022 Bahrami .................. G06F 8/74

FOREIGN PATENT DOCUMENTS

CN 114968325 A * 8/2022

OTHER PUBLICATIONS

Erik Linstead et al., "Mining Concepts from Code with Probabilistic Topic Models", [Online], pp. 461-464, [Retrieved from Interent on Jun. 3, 2023], <https://dl.acm.org/doi/pdf/10.1145/1321631.1321709>, (Year: 2007).*

Wei Emma Zhang et al., "Mining Source Code Topics through Topic Model and Words Embedding", [Online], pp. 1-13, [Retrieved from Interent on Jun. 3, 2023], <https://www.researchgate.net/profile/Wei-Emma-Zhang/publication/309962373>, (Year: 2016).*

* cited by examiner

*Primary Examiner* — Ziaul A Chowdhury
(74) *Attorney, Agent, or Firm* — Greenblum & Bernstein, P.L.C.

(57) ABSTRACT

A method for facilitating automatic assignment of code topics is provided. The method includes accessing a database, the database including data that is associated with a known code topic and data that is associated with an unknown code topic; parsing the database to identify a data file that includes a code snippet, document strings, and/or dependencies. Dividing the identified data file into a training data set and a testing data set; generating a first set of features for each element of the code snippet, document strings, and dependencies, for the training data set; generating a second set of features for the testing data set; identifying, by using a model, a representative feature for the training data set based on frequency distribution of the training data set, the representative feature including a corresponding probability; and determining, by using clustering, a code topic for the data file.

18 Claims, 7 Drawing Sheets

METHOD AND SYSTEM FOR AUTOMATIC ASSIGNMENT OF CODE TOPICS

BACKGROUND

1. Field of the Disclosure

This technology generally relates to methods and systems for assigning code topics, and more particularly to methods and systems for facilitating automatic assignment of code topics on code repositories by using code structures, document strings, and dependencies.

2. Background Information

Many business entities operate expansive code repositories that are utilized by various software programs to provide services for consumers. Often, to facilitate the development of the software programs, the code repositories must be analyzed and assigned a corresponding topic. For example, when a code repository is identified as a machine learning code repository, related software development platforms may be recommended to assist developers. Historically, implementation of conventional code topic assignment techniques has resulted in varying degrees of success with respect to accurate and timely identification of code topics.

One drawback of implementing conventional code topic assignment techniques is that in many instances, the determined code topics do not match the code repositories. As a result, manual review of the determined code topics is required to ensure accurate tagging of the code repositories. Additionally, since conventional code topic assignment techniques require entire code repositories for analysis, large numbers of repositories are required to train predictive models, which are only usable on final, production-ready code repositories.

Therefore, there is a need for an analysis technique that is based on machine learning to facilitate automatic assignment of code topics on code repositories by using code structures, document strings, and dependencies.

SUMMARY

The present disclosure, through one or more of its various aspects, embodiments, and/or specific features or sub-components, provides, inter alia, various systems, servers, devices, methods, media, programs, and platforms for facilitating automatic assignment of code topics on code repositories by using code structures, document strings, and dependencies.

According to an aspect of the present disclosure, a method for facilitating automatic assignment of code topics is provided. The method may be implemented by at least one processor. The method may include accessing at least one database, the at least one database may include data that is associated with a known code topic and data that is associated with an unknown code topic; parsing the at least one database to identify at least one data file; dividing the at least one identified data file into at least one training data set and at least one testing data set; generating at least one first set of features for the at least one training data set; generating at least one second set of features for the at least one testing data set; identifying at least one representative feature for the at least one training data set based on data distribution of the at least one training data set, each of the at least one representative feature may include a corresponding probability; and determining, by using at least one model, at least one code topic for each of the at least one data file.

In accordance with an exemplary embodiment, for generating the at least one first set of features, the method may further include extracting at least one document string from the at least one training data set, the at least one document string may relate to a developer comment in the at least one training data set; extracting at least one abstract syntax tree from the at least one training data set, the at least one abstract syntax tree may relate to a structure of the at least one training data set; and generating the at least one first set of features based on the extracted at least one document string and the extracted at least one abstract syntax tree.

In accordance with an exemplary embodiment, for generating the at least one second set of features, the method may further include extracting at least one document string from the at least one testing data set, the at least one document string may relate to a developer comment in the at least one testing data set; extracting at least one dependency characteristic from the at least one training data set, the at least one dependency characteristic may relate to a reliance between the at least one training data set and another data set; extracting at least one abstract syntax tree from the at least one testing data set, the at least one abstract syntax tree may relate to a structure of the at least one testing data set; and generating the at least one second set of features based on the extracted at least one document string and the extracted at least one abstract syntax tree.

In accordance with an exemplary embodiment, for determining the at least one code topic, the method may further include comparing, the at least one representative feature with the at least one second set of features; determining at least one matching feature based on a result of the comparison; determining at least one score for each of the at least one matching feature; and generating at least one graphical element based on the at least one matching feature and the at least one score.

In accordance with an exemplary embodiment, the at least one score may include a total probability value, the total probability value may result from a summation of a probability value that is associated with each of the at least one matching feature.

In accordance with an exemplary embodiment, the at least one code topic may relate to a trait of the at least one data file that is usable to facilitate a classification of the at least one data file, the at least one code topic may include at least one from among a machine learning code topic and a non-machine learning code topic.

In accordance with an exemplary embodiment, the at least one data file may include at least one code snippet, the at least one code snippet may relate to a small region of reusable code that corresponds to a source code.

In accordance with an exemplary embodiment, the at least one first set of features may be associated with the at least one training data set on a repository level and a file level, and wherein the at least one second set of features may be associated with the at least one testing data set on the repository level and the file level.

In accordance with an exemplary embodiment, the at least one model may include at least one from among a machine learning model, a statistical model, a mathematical model, a process model, and a data model.

According to an aspect of the present disclosure, a computing device configured to implement an execution of a method for facilitating automatic assignment of code topics is disclosed. The computing device comprising a processor; a memory; and a communication interface coupled to each of the processor and the memory, wherein the processor may be configured to access at least one database, the at least one database may include data that is associated with a known code topic and data that is associated with an unknown code topic; parse the at least one database to identify at least one data file; divide the at least one identified data file into at least one training data set and at least one testing data set; generate at least one first set of features for the at least one training data set; generate at least one second set of features for the at least one testing data set; identify at least one representative feature for the at least one training data set based on data distribution of the at least one training data set, each of the at least one representative feature may include a corresponding probability; and determine, by using at least one model, at least one code topic for each of the at least one data file.

In accordance with an exemplary embodiment, for generating the at least one first set of features, the processor may be further configured to extract at least one document string from the at least one training data set, the at least one document string may relate to a developer comment in the at least one training data set; extract at least one abstract syntax tree from the at least one training data set, the at least one abstract syntax tree may relate to a structure of the at least one training data set; and generate the at least one first set of features based on the extracted at least one document string and the extracted at least one abstract syntax tree.

In accordance with an exemplary embodiment, for generating the at least one second set of features, the processor may be further configured to extract at least one document string from the at least one testing data set, the at least one document string may relate to a developer comment in the at least one testing data set; extract at least one dependency characteristic from the at least one training data set, the at least one dependency characteristic may relate to a reliance between the at least one training data set and another data set; extract at least one abstract syntax tree from the at least one testing data set, the at least one abstract syntax tree may relate to a structure of the at least one testing data set; and generate the at least one second set of features based on the extracted at least one document string and the extracted at least one abstract syntax tree.

In accordance with an exemplary embodiment, for determining the at least one code topic, the processor may be further configured to compare the at least one representative feature with the at least one second set of features; determine at least one matching feature based on a result of the comparison; determine at least one score for each of the at least one matching feature; and generate at least one graphical element based on the at least one matching feature and the at least one score.

In accordance with an exemplary embodiment, the at least one score may include a total probability value, the total probability value may result from a summation of a probability value that is associated with each of the at least one matching feature.

In accordance with an exemplary embodiment, the at least one code topic may relate to a trait of the at least one data file that is usable to facilitate a classification of the at least one data file, the at least one code topic may include at least one from among a machine learning code topic and a non-machine learning code topic.

In accordance with an exemplary embodiment, the at least one data file may include at least one code snippet, the at least one code snippet may relate to a small region of reusable code that corresponds to a source code.

In accordance with an exemplary embodiment, the processor may be further configured to associate the at least one first set of features with the at least one training data set on a repository level and a file level, and wherein the processor may be further configured to associate the at least one second set of features with the at least one testing data set on the repository level and the file level.

In accordance with an exemplary embodiment, the at least one model may include at least one from among a machine learning model, a statistical model, a mathematical model, a process model, and a data model.

According to an aspect of the present disclosure, a non-transitory computer readable storage medium storing instructions for facilitating automatic assignment of code topics is disclosed. The storage medium comprising executable code which, when executed by a processor, may cause the processor to access at least one database, the at least one database may include data that is associated with a known code topic and data that is associated with an unknown code topic; parse the at least one database to identify at least one data file; divide the at least one identified data file into at least one training data set and at least one testing data set; generate at least one first set of features for the at least one training data set; generate at least one second set of features for the at least one testing data set; identify at least one representative feature for the at least one training data set based on data distribution of the at least one training data set, each of the at least one representative feature may include a corresponding probability; and determine, by using at least one model, at least one code topic for each of the at least one data file.

In accordance with an exemplary embodiment, when executed by the at least one processor to determine the at least one code topic, the executable code further causes the processor to compare the at least one representative feature with the at least one second set of features; determine at least one matching feature based on a result of the comparison; determine at least one score for each of the at least one matching feature; and generate at least one graphical element based on the at least one matching feature and the at least one score.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
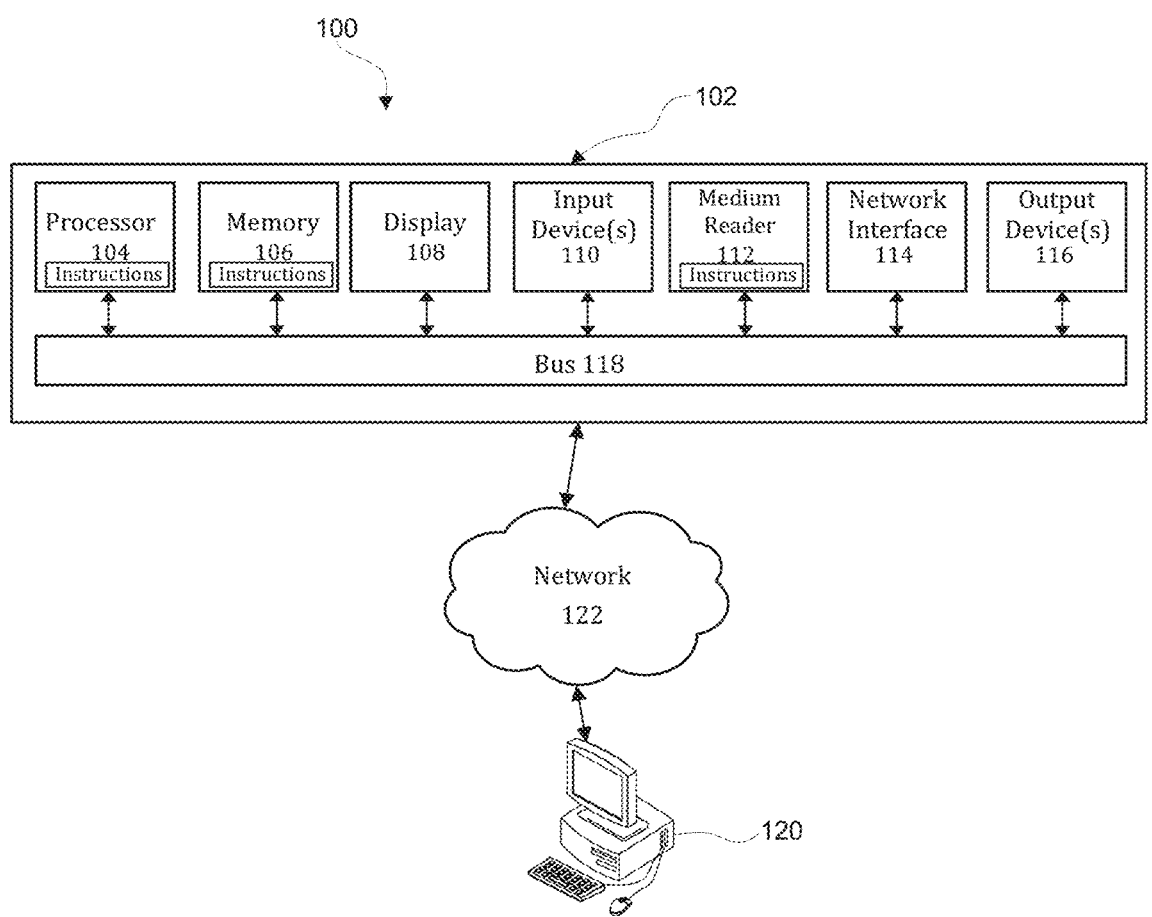
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating automatic assignment of code topics on code repositories by using code structures, document strings, and dependencies.

Figure 2:
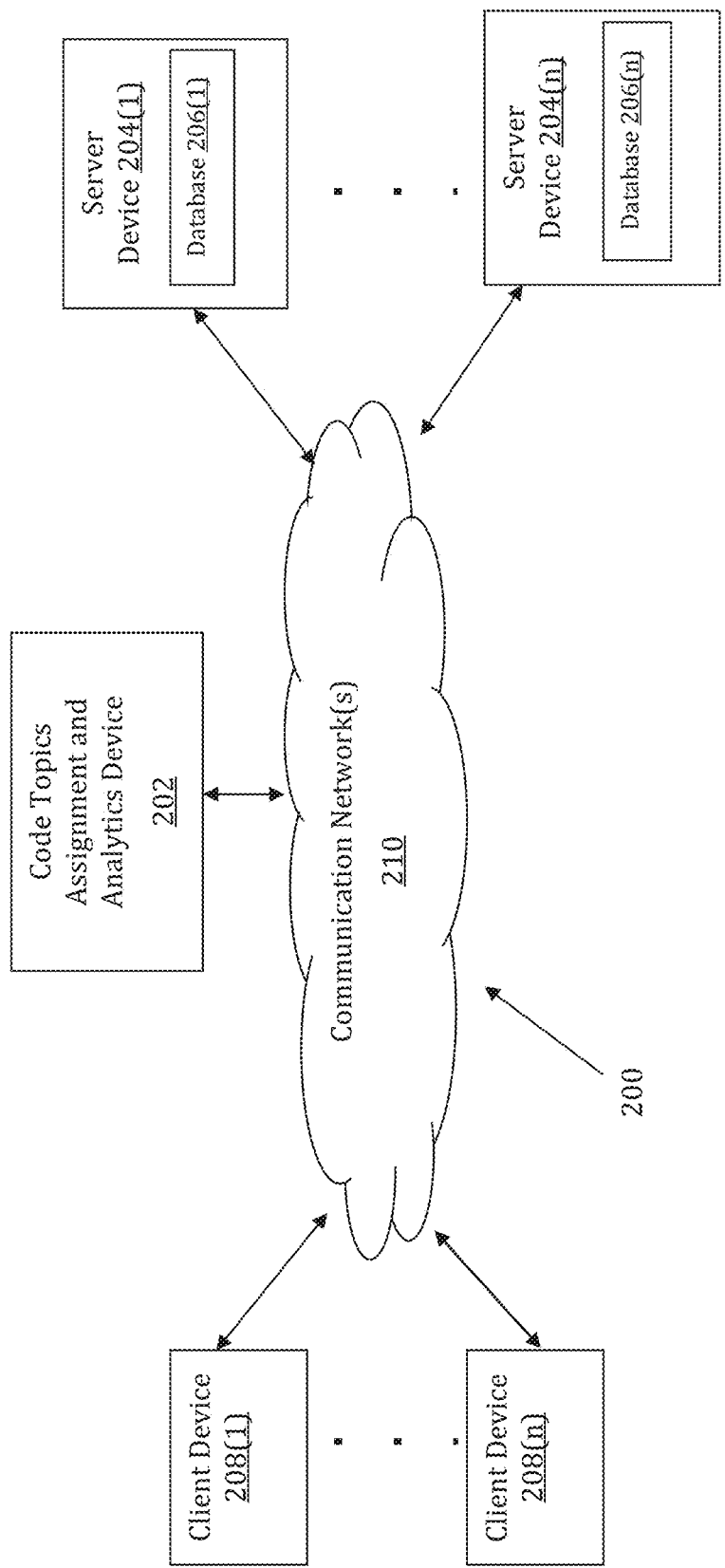
FIG. 2 illustrates an exemplary diagram of a network environment.

Referring to FIG. 2, a schematic of an exemplary network environment 200 for implementing a method for facilitating automatic assignment of code topics on code repositories by using code structures, document strings, and dependencies is illustrated. In an exemplary embodiment, the method is executable on any networked computer platform, such as, for example, a personal computer (PC).

The method for facilitating automatic assignment of code topics on code repositories by using code structures, document strings, and dependencies may be implemented by a Code Topics Assignment and Analytics (CTAA) device 202. The CTAA device 202 may be the same or similar to the computer system 102 as described with respect to FIG. 1. The CTAA device 202 may store one or more applications that can include executable instructions that, when executed by the CTAA device 202, cause the CTAA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CTAA device 202 itself, may be located in virtual server(s) running in a cloud-based computing environment rather than being tied to one or more specific physical network computing devices. Also, the application(s) may be running in one or more virtual machines (VMs) executing on the CTAA device 202. Additionally, in one or more embodiments of this technology, virtual machine(s) running on the CTAA device 202 may be managed or supervised by a hypervisor.

In the network environment 200 of FIG. 2, the CTAA device 202 is coupled to a plurality of server devices 204(1)-204(n) that hosts a plurality of databases 206(1)-206(n), and also to a plurality of client devices 208(1)-208(n) via communication network(s) 210. A communication interface of the CTAA device 202, such as the network interface 114 of the computer system 102 of FIG. 1, operatively couples and communicates between the CTAA device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CTAA device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CTAA devices that efficiently implement a method for facilitating automatic assignment of code topics on code repositories by using code structures, document strings, and dependencies.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CTAA device 202 may be a standalone device or integrated with one or more other devices or apparatuses, such as one or more of the server devices 204(1)-204(n), for example. In one particular example, the CTAA device 202 may include or be hosted by one of the server devices 204(1)-204(n), and other arrangements are also possible. Moreover, one or more of the devices of the CTAA device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CTAA device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to known code topics, unknown code topics, data files, training data sets, testing data sets, first set of features, second set of features, models, representative features, distributions, document strings, abstract syntax trees, matching features, probabilities, and scores.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CTAA device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CTAA device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CTAA device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CTAA device 202, the server devices 204(1)-204(n), or the client devices 208(1)-208(n), for example, may be configured to operate as virtual instances on the same physical machine. In other words, one or more of the CTAA device 202, the server devices 204(1)-204(n), or the client devices 208(1)-208(n) may operate on the same physical device rather than as separate devices communicating through communication network(s) 210. Additionally, there may be more or fewer CTAA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
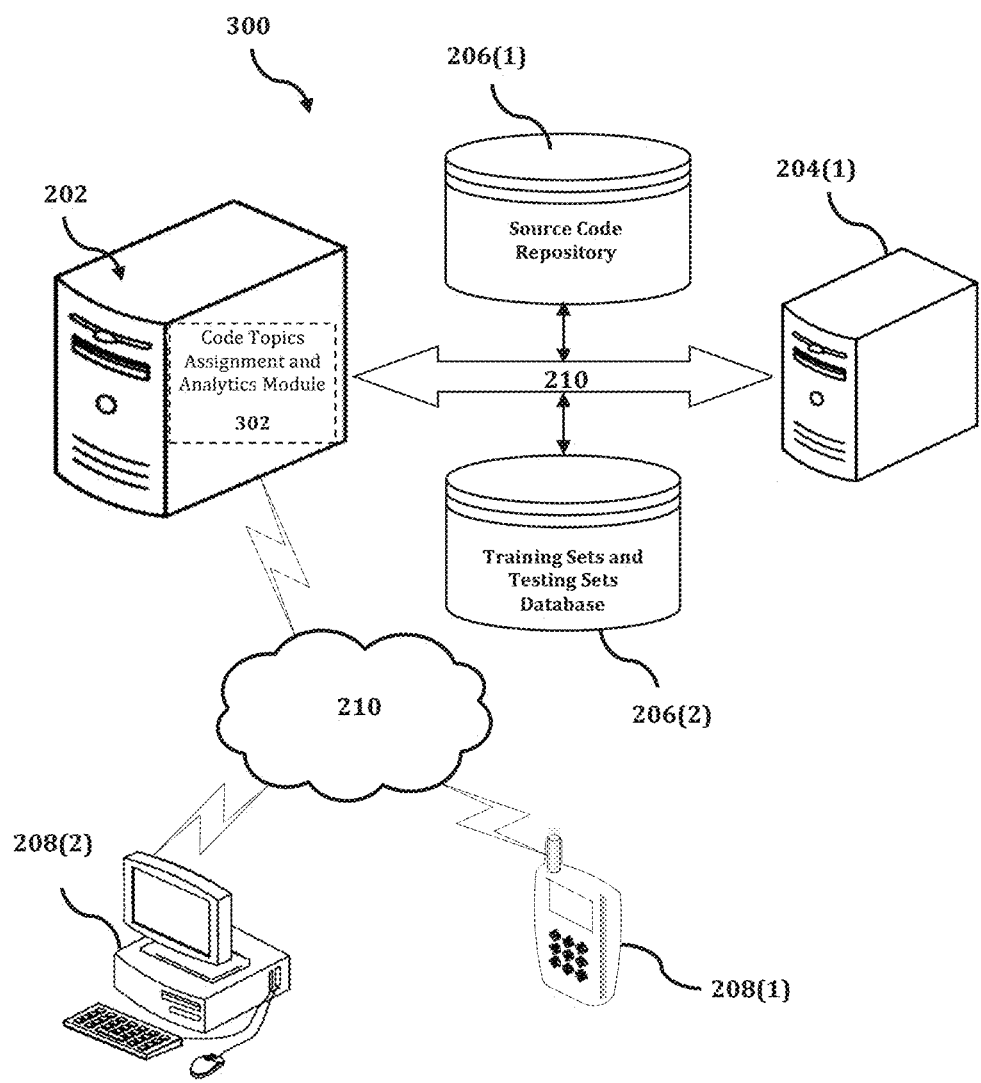
FIG. 3 shows an exemplary system for implementing a method for facilitating automatic assignment of code topics on code repositories by using code structures, document strings, and dependencies.

The CTAA device 202 is described and shown in FIG. 3 as including a code topics assignment and analytics module 302, although it may include other rules, policies, modules, databases, or applications, for example. As will be described below, the code topics assignment and analytics module 302 is configured to implement a method for facilitating automatic assignment of code topics on code repositories by using code structures, document strings, and dependencies.

An exemplary process 300 for implementing a mechanism for facilitating automatic assignment of code topics on code repositories by using code structures, document strings, and dependencies by utilizing the network environment of FIG. 2 is shown as being executed in FIG. 3. Specifically, a first client device 208(1) and a second client device 208(2) are illustrated as being in communication with CTAA device 202. In this regard, the first client device 208(1) and the second client device 208(2) may be "clients" of the CTAA device 202 and are described herein as such. Nevertheless, it is to be known and understood that the first client device 208(1) and/or the second client device 208(2) need not necessarily be "clients" of the CTAA device 202, or any entity described in association therewith herein. Any additional or alternative relationship may exist between either or both of the first client device 208(1) and the second client device 208(2) and the CTAA device 202, or no relationship may exist.

Further, CTAA device 202 is illustrated as being able to access a source code repository 206(1) and a training sets and testing sets database 206(2). The code topics assignment and analytics module 302 may be configured to access these databases for implementing a method for facilitating automatic assignment of code topics on code repositories by using code structures, document strings, and dependencies.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CTAA device 202 via broadband or cellular communication. Of course, these embodiments are merely exemplary and are not limiting or exhaustive.

Upon being started, the code topics assignment and analytics module 302 executes a process for facilitating automatic assignment of code topics on code repositories by using code structures, document strings, and dependencies. An exemplary process for facilitating automatic assignment of code topics on code repositories by using code structures, document strings, and dependencies is generally indicated at flowchart 400 in FIG. 4.

Figure 4:
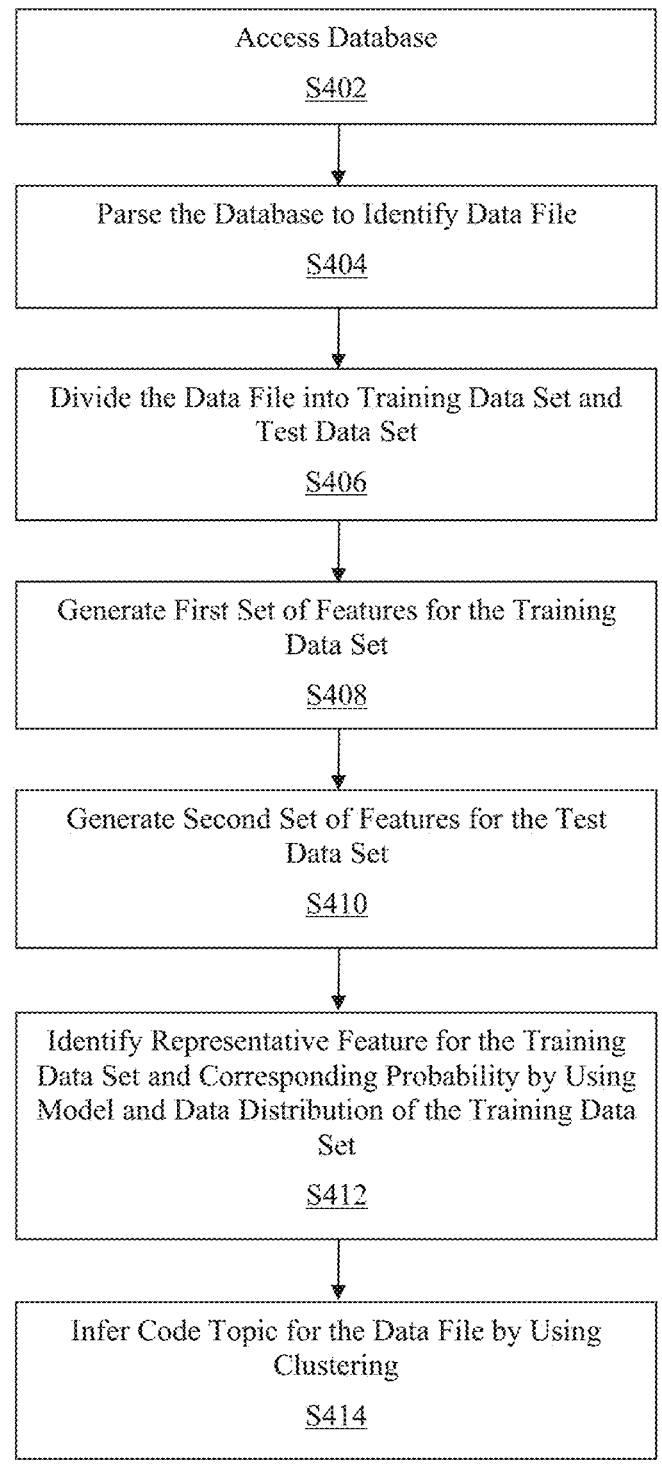
FIG. 4 is a flowchart of an exemplary process for implementing a method for facilitating automatic assignment of code topics on code repositories by using code structures, document strings, and dependencies.

In the process 400 of FIG. 4, at step S402, a database that includes various code repositories may be accessed. The database may include data that is associated with a known code topic and data that is associated with an unknown code topic. For example, the database may be crawled by topics using a crawler. The crawler may utilize a representational state transfer (REST) application programming interface (API) to crawl code ecosystems such as, for example, GITHUB.

In an exemplary embodiment, the various code repositories may include several types of software codes such as, for example, machine learning software codes. The software codes may include computer codes in a variety of platforms and specifications, such as, for example, JAVA and PYTHON. In another exemplary embodiment, the database may include first-party code repositories as well as third-party code repositories. The third-party code repositories may be accessible via a networked interface such as, for example, an application programming interface. In another exemplary embodiment, the database may include completed code repositories as well as incomplete code repositories such as, for example, prototype code repositories.

At step S404, the database may be parsed to identify a data file. In an exemplary embodiment, the data file may include at least one from among a code snippet, a document string (docstring) and/or documents from codes such as, for example, JAVADOCS and PYTHON comments, as well as dependencies from the code such as, for example, library imports. The code snippet may relate to a small region of reusable code that corresponds to a source code. In another exemplary embodiment, utilization of the code snippet may enable analysis of uncompleted repositories. For example, by utilizing a code snippet, prototype repositories may be analyzed consistent with disclosures in the present application.

At step S406, the identified data file may be divided into a training data set and a testing data set. In an exemplary embodiment, the training data set and the testing data set may be further processed to facilitate structuring of the data. For example, the training data set and the testing data set may include preprocessed data that have been dimensionally reduced for smaller resulting vectors. Additionally, for docstrings, the data may have been preprocessed to remove meaningless words and characters such as, for example, spacing characters. In another exemplary embodiment, the preprocessing of the data may include translation of code elements from one programing language to another. The translation process may include manual as well as automatic mapping of the code elements. As will be appreciated by a person of ordinary skill in the art, the preprocessing of the data file enables program language agnostic processing of various data files.

At step S408, a first set of features for the training data set may be generated. In an exemplary embodiment, the first set of features may include one vector per feature type that corresponds to the training data set. For example, the first set of features may include three vectors: one vector for structural elements, one vector for words, and one vector for dependencies. A frequency of occurrence, above the background, for each of the words, dependencies, and structural elements may also be determined. In another exemplary embodiment, machine learning techniques such as, for example, natural language processing techniques may be utilized to identify words, dependencies, and structural elements that represent the training data set. For example, the first set of features for the training data set may include frequently occurring words and structural elements that have been determined to represent a machine learning characteristic of the training data.

In another exemplary embodiment, the sets of features may be generated by extracting a document string from the training data set. The document string (docstrings) may relate to a developer comment in the training data set. An abstract syntax tree may also be extracted from the training data set. The abstract syntax tree may relate to a structure of the training data set. The first set of features may then be generated based on the extracted document string and the extracted abstract syntax tree. In another exemplary embodiment, the first set of features may be associated with the training data set. The first set of tags may be associated with the training data set on a repository level as well as on a file level.

For each snippet in the code, the AST (Abstract Syntax Tree) may be parsed to identify features as a frequency vector, m. A frequency vector of words, s, and frequency vectors of libraries/dependencies, d, may also be created. As such, each repository may have sets of vectors: R={m1, m2, m3 ... }, {s1, s2, s3 ... }, {d1, d2, d3 ... }.

The frequency may be calculated as:

$$F_{m,s,d} = \frac{\sum m, s, d}{\|m, s, d\|}.$$

The sum is element wise summation that is calculated for each feature vectors (m, s, d), to generate 3 F vectors.

Where the clarity distribution, the probability of each feature to be in a topic divided by the probability to not be in the topic, may be calculated for each repository and each topic in the training set as:

$$C(\text{topic}) = \frac{\ln \langle F_{m,s,d} \rangle_{\in \text{topic}}}{\ln \langle F_{m,s,d} \rangle_{\notin \text{topic}}}.$$

C is calculated for each $F_m$, $F_s$, $F_d$ separately. The logarithm here may or may not be used to avoid dominating repeating terms in one specific method or file or repository.

At step S410, a second set of features for the testing data set may be generated. In an exemplary embodiment, the second set of features may include words, structural elements, and dependencies that corresponds to the testing data set. A frequency of occurrence for each of the words, structural elements, and dependencies may also be determined. In another exemplary embodiment, machine learning techniques such as, for example, natural language processing techniques may be utilized to identify words, structural elements, and dependencies that represents the testing data set. For example, the second set of features for the testing data set may include frequently occurring words, structural elements, and dependencies that have been determined to represent a machine learning characteristic of the testing data.

In another exemplary embodiment, the second set of features may be generated by extracting a document string from the testing data set. The document string may relate to a developer comment in the testing data set. An abstract syntax tree may also be extracted from the testing data set. The abstract syntax tree may relate to a structure of the testing data set. A second set of features may then be generated based on the extracted document string and the extracted abstract syntax tree. In another exemplary embodiment, the second set of features may be associated with the testing data set. The second set of features may be associated with the testing data set on a repository level as well as on a file level.

At step S412, a representative feature for the training data set may be identified. In an exemplary embodiment, the representative feature may be determined based on data distribution of the training data set. The representative feature may include a corresponding probability.

Repository frequencies (F) are calculated for test set repositories.

Each F for training set or test set repositories is used to calculate similarity with clarity distribution for each topic, for example: $F_{m,s,d} \cdot C(\text{topic}) / \|F_{m,s,d}\| \| C(\text{topic})$. The calculation results in three scores for each repository for each topic due to the three types of features. The scores for each repository in the collection of repositories of training or testing set can be used for clustering or classification of the topics.

At step S414, a code topic for the data file may be determined by using a model and data clustering techniques. In an exemplary embodiment, the code topic may relate to a trait of the data file that is usable to facilitate a classification of the data file. The code topic may include at least one from among a machine learning code topic and a non-machine learning code topic. In another exemplary embodiment, the data clustering techniques may relate to data extrapolation analysis of grouped data points. The grouped data points are more similar to each other than data points that belong to another grouping. In another exemplary embodiment, the groupings of the data points may be defined based on distances between cluster members, dense areas of the data space, interval statistical distributions, and/or particular statistical distributions consistent with disclosures in the present application.

In another exemplary embodiment, the code topic may relate to classifications of subtopics in the data file. A tree hierarchy may be utilized to facilitate the tagging of multi-topic data files as well as the tagging of subtopics in the data file. For example, the code topic may correspond to a natural language processing, machine learning code topic as well as a computer vision, machine learning code topic. Consistent with disclosures in the present application, clarity distributions may also be applied to subtopics of the data file. In another exemplary embodiment, the clarity distribution may illustrate a probability that a certain structural element is a part of a machine learning code topic.

In another exemplary embodiment, the code topic may be determined by comparing the representative feature with the second set of features. A matching feature may be determined based on a result of the comparison. The matching feature may include a representative feature that also appears in the second set of features. A score for the matching feature may also be determined consistent with disclosures in the present application. Then, a graphical element may be generated based on the matching feature and the determined score.

In another exemplary embodiment, the score may include a total probability value. The total probability value may result from a summation of a probability value that is associated with the matching feature. In another exemplary embodiment, the score may relate to a measure of similarity between two non-zero vectors on an inner product space such as, for example, a cosine similarity score. The score may include a metric that is used to measure how similar vectors are irrespective of distance from one vector to the other. Utilization of scoring in this manner may be advantageous because orientation of various vectors is accounted for despite differences in Euclidean distance.

In another exemplary embodiment, the model may include at least one from among a machine learning model, a statistical model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

In another exemplary embodiment, the graphical element may include a distribution diagram of the density of a certain topic in repositories. The distribution diagram may relate to a graphical representation of the clustering of the matching feature and the corresponding score. In another exemplary embodiment, the graphical representation of the clustering may relate to a mathematical diagram such as, for example, a scatter plot that uses Cartesian coordinates to display values of variables for a set of data. The displayed values may be coded based on at least one from among a color, a shape, and a size for differentiation. Data on the graphical representation may be displayed as a collection of points, each point having a value of a first variable that determines a position on a horizontal axis and a value of a second variable that determines a position on a vertical axis.

In another exemplary embodiment, a graphical user interface may be generated. The graphical user interface may be configured to display information relating to at least one from among the determined code topic, the data file, the score, and the graphical element. For example, the graphical user interface may include popular features that relate to frequently occurring words and structural elements that are used in a particular code topic such as 'classification,' 'loss,' 'train,' 'predict,' and 'training.' In another exemplary embodiment, the graphical element may be displayed for a developer in response to a request to analyze a code repository.

Figure 5:
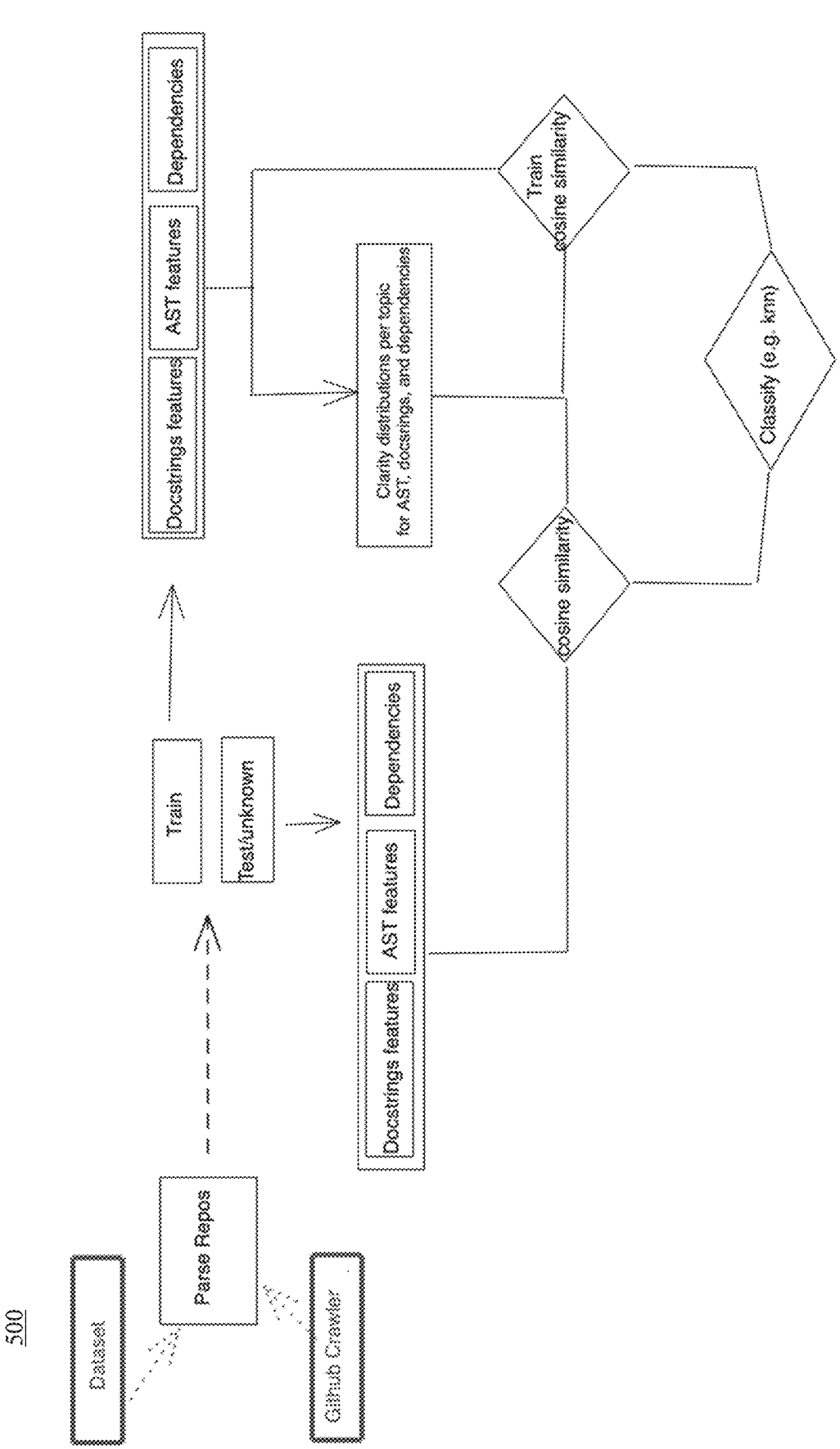
FIG. 5 is a flow diagram of an exemplary process for implementing a method for facilitating automatic assignment of code topics on code repositories by using code structures, document strings, and dependencies.

FIG. 5 is a flow diagram 500 of an exemplary process for implementing a method for facilitating automatic assignment of code topics on code repositories by using code structures, document strings, and dependencies. As illustrated in FIG. 5, a respiratory may be parsed to identify datasets by using a crawler such as, for example, a GITHUB crawler. Consistent with disclosures in the present application, the identified data sets may be divided into a training data set and a testing data set.

Features may then be created for each of the training data set and the testing data set by using document strings, code structures, and dependencies that are derived from a corresponding abstract syntax tree. The document strings may relate to developer comments in the training data set and in the testing data set. The abstract syntax tree may relate to a structure of the training data set and the testing data set. Further, representative features and corresponding probabilities may be identified based on data distribution of the training data set. The probability corresponding to each of the representative features may relate to a likelihood that a code snippet includes a particular code topic. For example, the probability may indicate that a certain code snippet has an eighty percent chance of being a machine learning code snippet based on analysis consistent with disclosures in the present application.

Finally, the representative features and the corresponding probabilities from the training data set may be used to identify a matching feature in the testing data set. When a matching feature is identified in the testing data set, an accuracy calculation may be made. The accuracy calculation may include a score calculation that represents the accuracy of the matching feature. In another exemplary embodiment, the score may represent each of the training data set and the testing data set to provide corresponding accuracy information.

Figure 6:
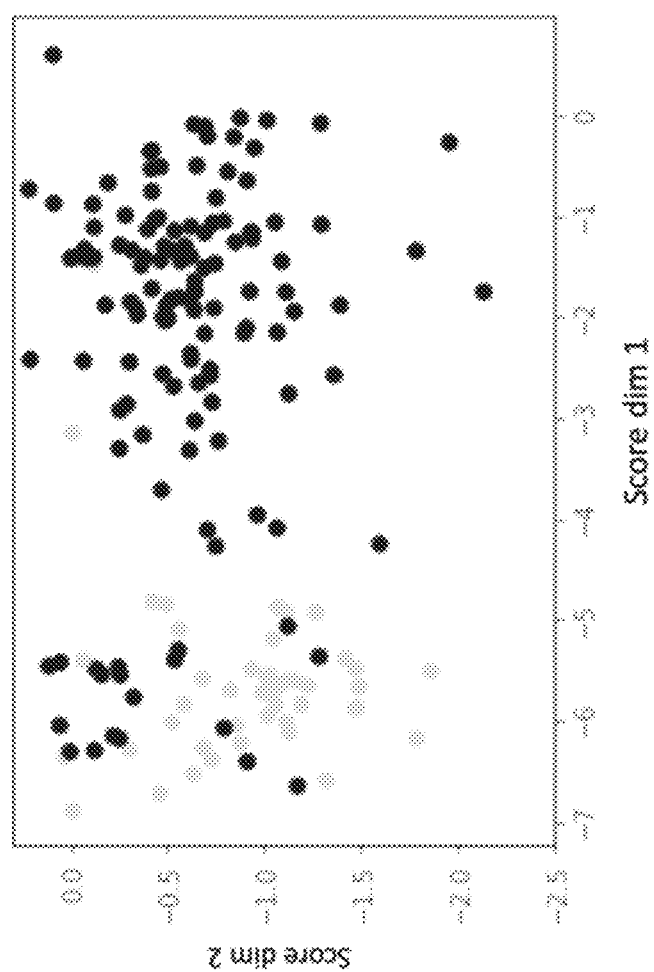
FIG. 6 is a graphical representation of an exemplary clustering by feature process for implementing a method for facilitating automatic assignment of code topics on code repositories by using code structures, document strings, and dependencies.

FIG. 6 is a graphical representation 600 of an exemplary clustering by feature process for implementing a method for facilitating automatic assignment of code topics on code repositories by using code structures, document strings, and dependencies. In FIG. 6, an exemplary test case is analyzed consistent with disclosures in the present application to determine whether a repository contains machine learning code or non-machine learning code.

As illustrated in FIG. 6, density distribution of a topic in a repository may be analyzed by using features. Consistent with disclosures in the present application, the frequency may be calculated as:

$$F_{m,s,d} = \frac{\sum m, s, d}{\|m, s, d\|}$$

for each features element, wherein m represents a frequency vector relating to a code structure, s represents a frequency vector of words, and d represents a frequency vector of dependencies. Where the clarity distribution, the probability of each feature to be in a topic divided by the probability to not be in the topic, may be calculated for each repository and each topic in the training set as:

$$C(\text{topic}) = \frac{\ln \langle F_{m,s,d} \rangle_{\in \text{topic}}}{\ln \langle F_{m,s,d} \rangle_{\notin \text{topic}}}.$$

The logarithm here may or may not be used to avoid dominating repeating terms in one specific method or file or repository.

Figure 7:
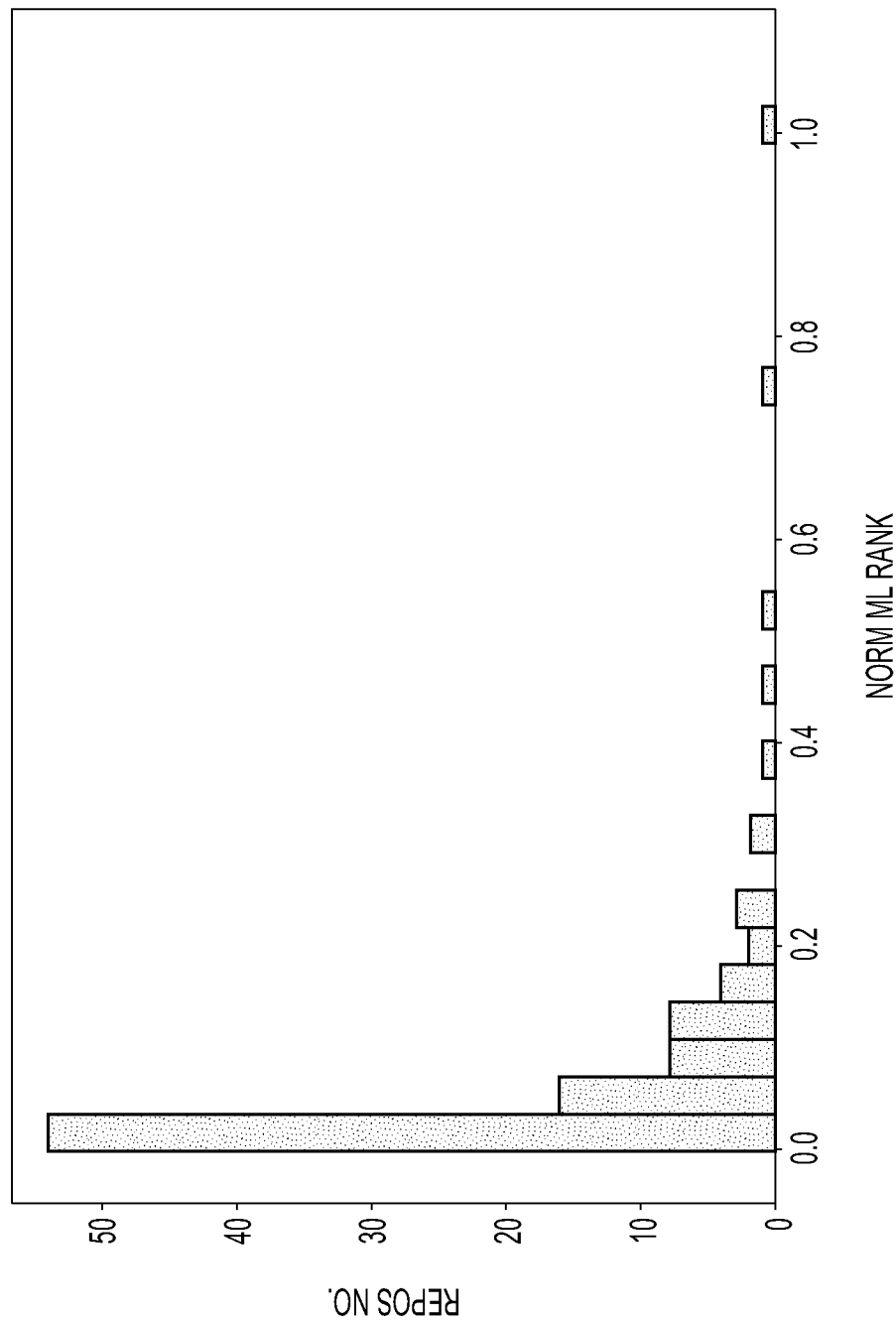
FIG. 7 is a graphical representation of an exemplary ranking by scores process for implementing a method for facilitating automatic assignment of code topics on code repositories by using code structures, document strings, and dependencies.

FIG. 7 is a graphical representation 700 of an exemplary ranking by scores process for implementing a method for facilitating automatic assignment of code topics on code repositories by using code structures, document strings, and dependencies. In FIG. 7, an exemplary test case is analyzed consistent with disclosures in the present application to determine whether a repository contains machine learning code or non-machine learning code.

As illustrated in FIG. 7, structures of snippets are ranked together with a corresponding likelihood that the snippets may be identified as a machine learning snippet to find repositories that use machine learning code. Additionally, frequency of the structural elements occurring in the repositories may also be used to rank the snippets.

To facilitate the rankings, frequently occurring structural elements from known machine learning repositories may be identified and associated with predetermined topics. Then, the unknown repositories may be examined to identify frequently occurring structural elements. The frequently occurring structural elements in the unknown repositories may be associated with topics consistent with disclosures in the present application. A comparison may be made between the frequently occurring structural elements in the known repositories and the frequently occurring structural elements in the unknown repositories. Based on a result of the comparison, a likelihood that the frequently occurring structural elements in the unknown repository correspond to machine learning codes may be calculated. As such, the effective density measure is the norm of the logarithm between the known structural elements and the unknown structural elements.

Accordingly, with this technology, an optimized process for facilitating automatic assignment of code topics on code repositories by using code structures, document strings, and dependencies is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating automatic assignment of code topics, the method being implemented by at least one processor, the method comprising:
   accessing, by the at least one processor, at least one database, the at least one database including data that is associated with a known code topic and data that is associated with an unknown code topic;
   parsing, by the at least one processor, the at least one database to identify at least one data file;
   dividing, by the at least one processor, the at least one identified data file into at least one training data set and at least one testing data set;
   generating, by the at least one processor, at least one first set of features for the at least one training data set;
   generating, by the at least one processor, at least one second set of features for the at least one testing data set by,
      extracting, by the at least one processor, at least one document string from the at least one testing data set, the at least one document string relating to a developer comment in the at least one testing data set;
      extracting, by the at least one processor, at least one dependency characteristic from the at least one training data set, the at least one dependency characteristic relating to a reliance between the at least one training data set and another data set;
      extracting, by the at least one processor, at least one abstract syntax tree from the at least one testing data set, the at least one abstract syntax tree relating to a structure of the at least one testing data set; and
      generating, by the at least one processor, at least one second set of features based on the extracted at least one document string, the extracted at least one dependency characteristic, and the extracted at least one abstract syntax tree;
   identifying, by the at least one processor, at least one representative feature for the at least one training data set based on data distribution of the at least one training data set, each of the at least one representative feature including a corresponding probability, and
   determining, by the at least one processor using at least one model, at least one code topic for each of the at least one data file.

2. The method of claim 1, wherein the generating of the at least one first set of features for the at least one training data set further comprises:
   extracting, by the at least one processor, at least one second document string from the at least one training data set, the at least one second document string relating to a second developer comment in the at least one training data set;
   extracting, by the at least one processor, at least one second dependency characteristic from the at least one training data set, the at least one second dependency characteristic relating to a reliance between the at least one training data set and the other data set;
   extracting, by the at least one processor, at least one second abstract syntax tree from the at least one training data set, the at least one second abstract syntax tree relating to a second structure of the at least one training data set; and
   generating, by the at least one processor, the at least one first set of features based on the extracted at least one second document string, the extracted at least one second dependency characteristic, and the extracted at least one second abstract syntax tree.

3. The method of claim 1, wherein determining the at least one code topic further comprises:
   comparing, by the at least one processor, the at least one representative feature with the at least one second set of features;
   determining, by the at least one processor, at least one matching feature based on a result of the comparison;
   determining, by the at least one processor, at least one score for each of the at least one matching feature; and
   generating, by the at least one processor, at least one graphical element based on the at least one matching feature and the at least one score.

4. The method of claim 3, wherein the at least one score includes a total probability value, the total probability value resulting from a summation of a probability value that is associated with each of the at least one matching feature.

5. The method of claim 1, wherein the at least one code topic relates to a trait of the at least one data file that is usable to facilitate a classification of the at least one data file, the at least one code topic including at least one from among a machine learning code topic and a non-machine learning code topic.

6. The method of claim 1, wherein the at least one data file includes at least one code snippet, the at least one code snippet relating to a small region of reusable code that corresponds to a source code.

7. The method of claim 1, wherein the at least one first set of features is associated with the at least one training data set on a repository level and a file level, and wherein the at least one second set of features is associated with the at least one testing data set on the repository level and the file level.

8. The method of claim 1, wherein the at least one model includes at least one from among a machine learning model, a statistical model, a mathematical model, a process model, and a data model.

9. A computing device configured to implement an execution of a method for facilitating automatic assignment of code topics, the computing device comprising:
- a processor;
- a memory; and
- a communication interface coupled to each of the processor and the memory, wherein the processor is configured to:
- access at least one database, the at least one database including data that is associated with a known code topic and data that is associated with an unknown code topic;
- parse the at least one database to identify at least one data file;
- divide the at least one identified data file into at least one training data set and at least one testing data set;
- generate at least one first set of features for the at least one training data set;
- generate at least one second set of features for the at least one testing data set; further causing the processor to:
  - extract at least one document string from the at least one testing data set, the at least one document string relating to a developer comment in the at least one testing data set;
  - extract at least one dependency characteristic from the at least one training data set, the at least one dependency characteristic relating to a reliance between the at least one training data set and another data set;
  - extract at least one abstract syntax tree from the at least one testing data set, the at least one abstract syntax tree relating to a structure of the at least one testing data set; and
  - generate the at least one second set of features based on the extracted at least one document string, the extracted at least one dependency characteristic, and the extracted at least one abstract syntax tree;
- identify at least one representative feature for the at least one training data set based on data distribution of the at least one training data set, each of the at least one representative feature including a corresponding probability; and
- determine, by using at least one model, at least one code topic for each of the at least one data file.

10. The computing device of claim 9, wherein, for the generating of the at least one first set of features for the at least one training data set, the processor is further configured to:
- extract at least one second document string from the at least one training data set, the at least one second document string relating to a second developer comment in the at least one training data set;
- extract at least one second dependency characteristic from the at least one training data set, the at least one second dependency characteristic relating to a reliance between the at least one training data set and the other data set;
- extract at least one second abstract syntax tree from the at least one training data set, the at least one second abstract syntax tree relating to a second structure of the at least one training data set; and
- generate the at least one first set of features based on the extracted at least one second document string, the extracted at least one second dependency characteristic, and the extracted at least one second abstract syntax tree.

11. The computing device of claim 9, wherein, for determining the at least one code topic, the processor is further configured to:
- compare the at least one representative feature with the at least one second set of features;
- determine at least one matching feature based on a result of the comparison;
- determine at least one score for each of the at least one matching feature; and
- generate at least one graphical element based on the at least one matching feature and the at least one score.

12. The computing device of claim 11, wherein the at least one score includes a total probability value, the total probability value resulting from a summation of a probability value that is associated with each of the at least one matching feature.

13. The computing device of claim 9, wherein the at least one code topic relates to a trait of the at least one data file that is usable to facilitate a classification of the at least one data file, the at least one code topic including at least one from among a machine learning code topic and a non-machine learning code topic.

14. The computing device of claim 9, wherein the at least one data file includes at least one code snippet, the at least one code snippet relating to a small region of reusable code that corresponds to a source code.

15. The computing device of claim 9, wherein the processor is further configured to associate the at least one first set of features with the at least one training data set on a repository level and a file level, and wherein the processor is further configured to associate the at least one second set of features with the at least one testing data set on the repository level and the file level.

16. The computing device of claim 9, wherein the at least one model includes at least one from among a machine learning model, a statistical model, a mathematical model, a process model, and a data model.

17. A non-transitory computer readable storage medium storing instructions for facilitating automatic assignment of code topics, the storage medium comprising executable code which, when executed by a processor, causes the processor to:
- access at least one database, the at least one database including data that is associated with a known code topic and data that is associated with an unknown code topic;
- parse the at least one database to identify at least one data file;
- divide the at least one identified data file into at least one training data set and at least one testing data set;
- generate at least one first set of features for the at least one training data set;
- generate at least one second set of features for the at least one testing data set by further causing the processor to:
  - extract at least one document string from the at least one testing data set, the at least one document string relating to a developer comment in the at least one testing data set;
  - extract at least one dependency characteristic from the at least one training data set, the at least one dependency characteristic relating to a reliance between the at least one training data set and another data set;

extract at least one abstract syntax tree from the at least one testing data set, the at least one abstract syntax tree relating to a structure of the at least one testing data set; and generate the at least one second set of features based on the extracted at least one document string, the extracted at least one dependency characteristic, and the extracted at least one abstract syntax tree;

identify at least one representative feature for the at least one training data set based on data distribution of the at least one training data set, each of the at least one representative feature including a corresponding probability, and determine, by using at least one model, at least one code topic for each of the at least one data file.

18. The storage medium of claim 17, wherein, when executed by the at least one processor to determine the at least one code topic, the executable code further causes the processor to:

compare the at least one representative feature with the at least one second set of features;

determine at least one matching feature based on a result of the comparison;

determine at least one score for each of the at least one matching feature; and generate at least one graphical element based on the at least one matching feature and the at least one score.

* * * * *